July 29, 1941. H. F. TÖNNIES 2,250,898
PHOTOGRAPHIC APPARATUS
Filed Dec. 9, 1938 2 Sheets-Sheet 1
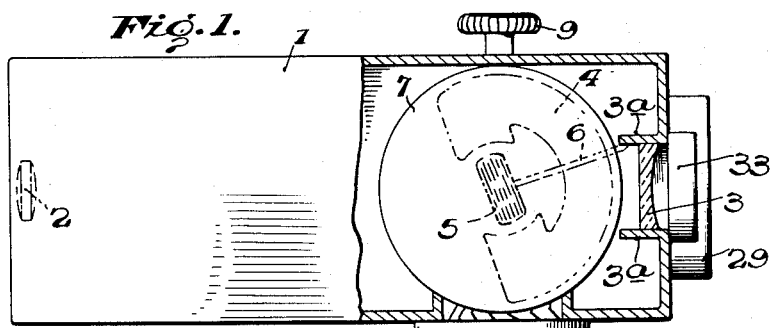
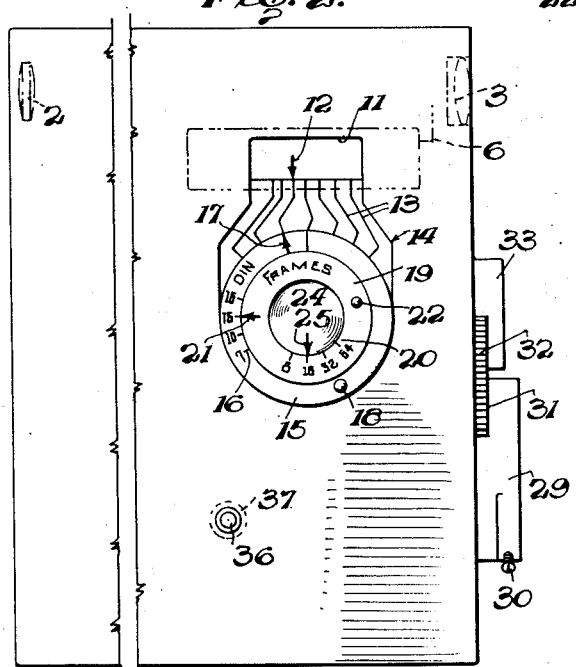
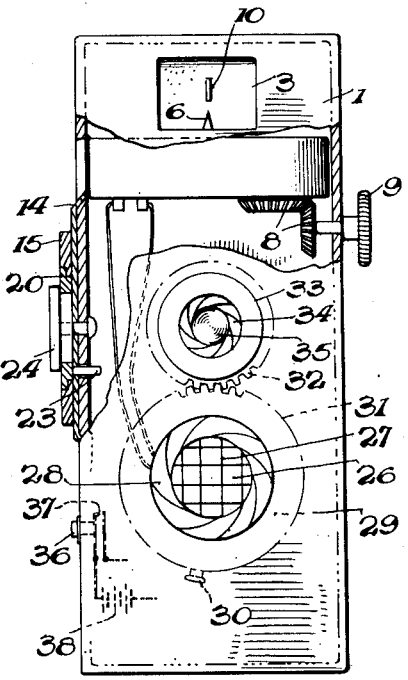
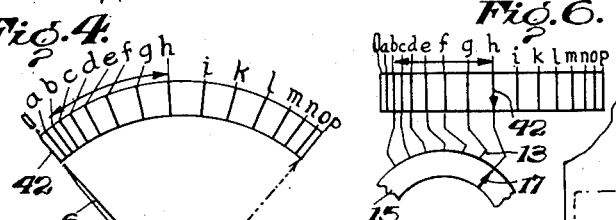
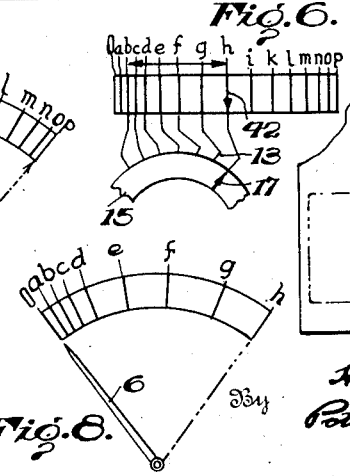
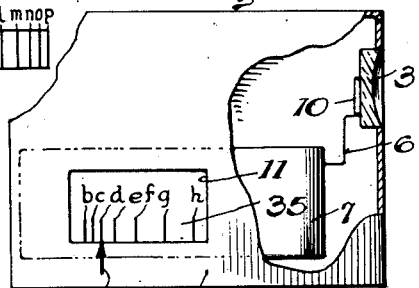

July 29, 1941.  H. F. TÖNNIES  2,250,898
PHOTOGRAPHIC APPARATUS
Filed Dec. 9, 1938   2 Sheets-Sheet 2
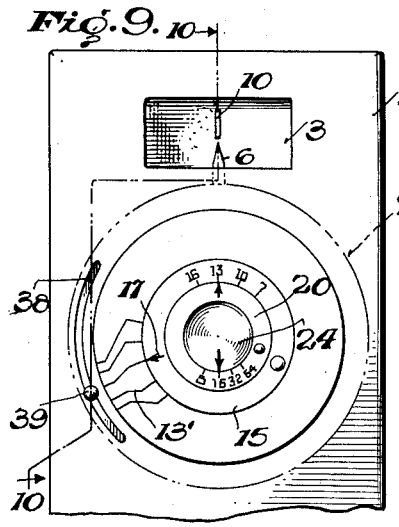
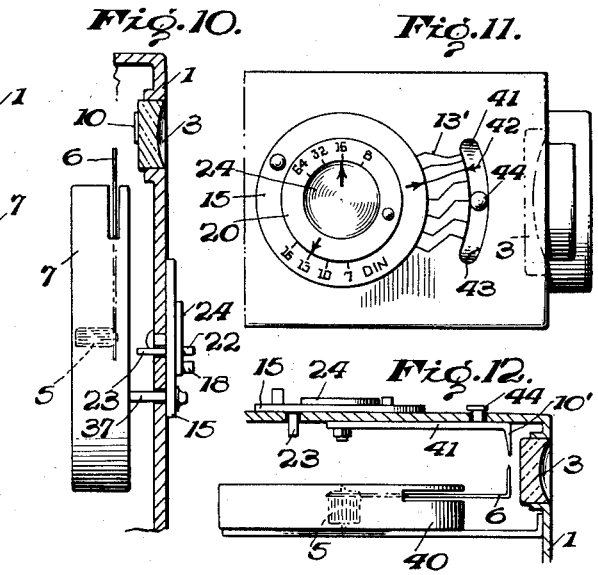
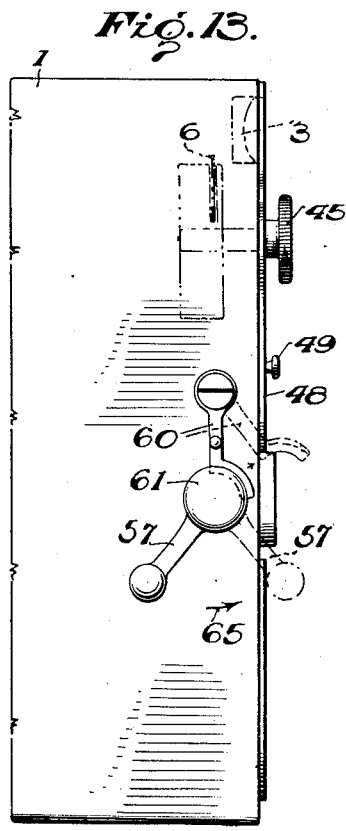
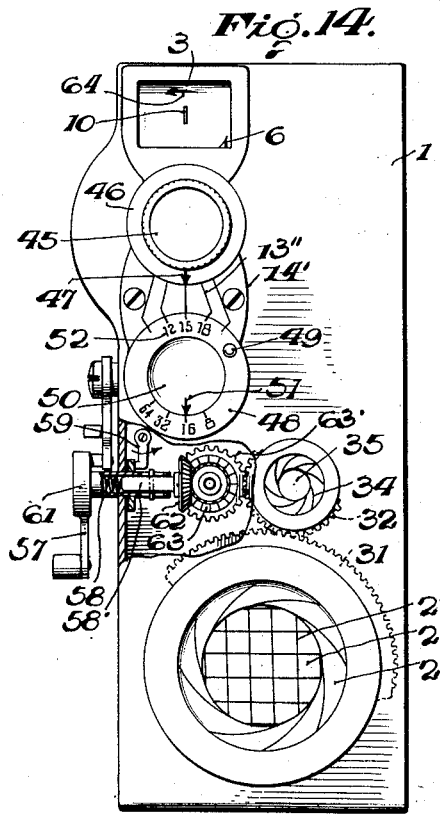
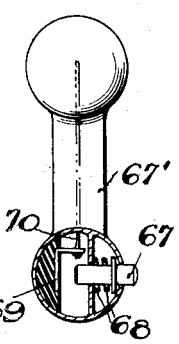
Inventor:
Hans Ferdinand Tönnies,
By Potter, Pierce & Scheffler,
Attorneys.

Patented July 29, 1941

2,250,898

UNITED STATES PATENT OFFICE 2,250,898

PHOTOGRAPHIC APPARATUS

Hans Ferdinand Tönnies, Hamburg-Grossflottbek, Germany

Application December 9, 1938, Serial No. 244,857
In Germany June 4, 1938

18 Claims. (Cl. 95—10)

This invention relates to photographic apparatus and particularly to a camera including photoelectric apparatus for the regulation of the diaphragm or the shutter mechanism.

The apparatus includes a photoelectric system, a measuring instrument, and adjustable devices coupled to the camera diaphragm or shutter for regulating the current flow to set the instrument pointer at a selected mark. The invention will be described with reference to semi-automatic motion picture cameras.

An object is to provide photographic apparatus including an instrument having a pointer, an indicator mark, mechanism for adjusting the instrument or the indicator mark over a range corresponding to maximum variation in initially selected exposure factors (film speed and shutter timing or diaphragm opening) and a current choke coupled to an adjustable element of the diaphragm or shutter, whereby adjustment of that member to bring the pointer in line with the mark sets the final exposure factor to the value appropriate for the existing scene brightness and the initially selected exposure values. An object is to provide photoelectric apparatus for the semi-automatic setting of a camera diaphragm, the apparatus including a photocell, an instrument having a pointer, a member carrying an indicator mark, adjustable devices including scales graduated in exposure factors for setting the instrument and indicator mark in relative positions corresponding to selected values of certain exposure factors, and a current choke connected to and adjustable by the setting member of the camera diaphragm. A further object is to provide apparatus of the type stated in which the instrument pointer and the mark are continuously visible in the camera view finder, thus permitting the operator to adjust the diaphragm member during the taking of pictures to maintain the pointer in line with the mark. More specifically, an object is to provide photoelectric apparatus including a measuring instrument having a pointer that is to be set in line with a mark by the adjustment of the camera diaphragm or shutter, and graduated scales for adjusting the instrument or the mark angularly about the axis of the pointer in accordance with selected values of exposure factors. A further object is to provide a motion picture camera having a semi-automatic photoelectric system for setting the camera diaphragm, a control member adjustable to put the camera in operation and to control the camera diaphragm, and a switch mounted on the control member for the circuit of the photoelectric system.

These and other objects and advantages of the invention will be apparent from the following specification when taken with the accompanying drawings in which:

Fig. 1 is a top view, with parts in section, of a motion picture camera embodying the invention;

Fig. 2 is a side elevation;

Fig. 3 is a front elevation, with parts in section;

Figs. 4 to 6 are diagrammatic scales or scale value tabulations;

Fig. 7 is a fragmentary side elevation, with parts in section, of another embodiment;

Fig. 8 is a diagram of the scale of an instrument of limited measuring range;

Fig. 9 is a fragmentary front elevation of another embodiment of the invention;

Fig. 10 is a transverse section on line 10 of Fig. 11;

Figs. 11 and 12 are a fragmentary plan and sectional view, respectively, of an embodiment in which the instrument is fixed and the indicator mark is adjusted;

Figs. 13 and 14 are a fragmentary side elevation and a front elevation, respectively, of a motion picture camera which constitutes a further embodiment of the invention; and Fig. 15 is a fragmentary detail of a modified diaphragm control lever for the camera of Figs. 13 and 14.

In the drawings, the reference numeral 1 identifies the case of a motion picture camera which has view finder lens 2, 3 mounted in the upper section thereof in a known manner. A sensitive measuring instrument is located below the light passage of the view finder and comprises a permanent magnet 4, pivoted coil 5 and pointer 6, and a base or instrument case 7 that is supported for angular adjustment about the axis of the coil 5 through gears 8 and a knob 9 at the exterior of the camera case. The end of pointer 6 is upturned to extend into the field of the view finder for cooperation with an indicator mark 10 that may be engraved in or painted on the view finder lens 3. The pointer 6 is retained within the view finder field by stops which may conveniently be provided by the wall sections 3a which support the lens 3.

A window or opening 11 is formed in one side of the case 1 adjacent the side of the instrument casing 7 opposite the adjusting knob 9, and a mark 12 on the instrument casing is visible through this opening. Guide lines 13 extend along a plate 14 below the opening 11, the lower ends of the lines being equally spaced and terminating at and radially to the edge of a disk 15 carrying a scale 16 of emulsion speed graduations, for example degrees DIN, a mark 17, and an adjusting knob 18. Disk 15 is rotatable about an inner disk 19 that has a scale 20 of frames per second, a mark 21 for cooperation with the emulsion speed scale, and an adjusting knob. A stud 23 projects from the disk 19 to the interior of case 1 to set the frame speed of the camera. A central disk 24 is secured to the case 1 and carries the mark 25 for setting the picture frame scale 20.

A photoelectric cell 26 receives light through the baffle 27 and an iris diaphragm 28. The outer shell 29 of the photocell housing has a handle 30 for rotating the shell to adjust the diaphragm. The shell 29 carries a gear segment 31 which meshes with gear 32 on the member 33 that adjusts the iris diaphragm 34 of the camera lens 35. The diaphragm mechanisms are designed for a change of their apertures in the same sense as the knob 30 is shifted, and the resultant changes in the effective photocell area produce changes in current flow that cause the pointer 6, as seen in the view finder, to travel in the direction of movement of the iris diaphragm knob.

The mechanism for operating the camera shutter may be either a spring or an electric motor. The illustrated camera is assumed to be of the electrically actuated type having a push button 36 for closing a switch 37 to complete the circuit from a battery 38 to the motor, not shown.

The camera is operated in the following manner. Rings 15 and 19 are adjusted, by grasping the studs 18 and 22, to set the film speed value of scale 16 opposite the mark 21, and ring 19 is then adjusted to aline the shutter timing value, i. e. the number of frames per second, with the fixed mark 25. Rings 15 and 19 are preferably in frictional engagement and this adjustment of the inner ring 19 carries the ring 15 with it to displace the mark 17 along the ends of guide lines 13. The instrument is then adjusted by turning knob 9 to aline the mark 12 of the instrument case with the guide line 13 that terminates at the mark 17. The camera is directed towards the scene and the iris diaphragm knob 30 is then adjusted to bring the instrument pointer into line with the mark 10. The switch button 38 is pressed inward to start the camera, and the iris diaphragm knob 30 is adjusted, if necessary, during the taking of the motion picture to retain the pointer 6 in line with the mark 10.

The angular adjustment of the instrument case 7 alters the torque or current flow that will bring the pointer 6 to the fixed mark 10, and the particular current flow that is appropriate in any given case is indicated by the position of the mark 17. The lens diaphragm opening is set correctly for different light values when the coupled iris diaphragms are so adjusted that the output current of the cell 26 maintains the pointer 6 on the mark 10.

As noted above, the pointer 6 "follows" the direction of movement of the knob 30 and this facilitates the adjustment of the apparatus as the normal reaction of the operator is to move the knob 30 in the direction in which the image of pointer 6 must be moved to return it to the indicator mark 10. The pointer 6 is retained continuously in sight in the view finder by the stops 3a and thus eliminates any doubt as to the direction in which the iris diaphragm should be adjusted.

The reason for the irregular spacing of the upper ends of guide lines will be apparent from a consideration of Figs. 4 to 6. Assuming that the measuring instrument has a measuring scope of from 1 to 16,000, i.e. that the smallest easily recognizable pointer displacement corresponds, for example, to about 0.06 lux and that the maximum deviation corresponds to about 1000 lux, a scale 42 of geometrically related pointer displacements, $0, a, b, \ldots p$ may take the form shown in Fig. 5. Scale division $a$ corresponds to a light intensity at the photocell of the assumed value of 0.06 lux, division $b$ corresponds to a doubling of the light value or 0.12 lux, division $c$ to 0.24 lux, etc. The scale graduations thus correspond to the geometric progression, $aq^{-1}, aq^0, aq^1, aq^2 \ldots aq^n$, where $a=1$, $q=2$; $n$ is a finite number. The scale range $0-a$ is the value $aq^{-1}$, the scale range $0-b$ is $aq^0$, etc. The successive angular displacements of the pointer 6 for this series of values are usually unequal and of the general type shown in Figs. 4 and 6.

The values of emulsion speed and of shutter timing or frames per second also constitute geometric progressions in which the four indicated values of each exposure factor are related as 1:2:4:8. Combinations of these exposure factors provide a range of photographic values of 1 to 64 which may be tabulated, as in Fig. 5, in terms of seven successive instrument graduations. The scale value $b$ was assumed to be the smallest easily read indication and this value appears in Fig. 5 at the intersection of the 16° DIN and the 8 frames rows. This combination of preselected exposure factors requires the minimum light for a proper exposure and, assuming the iris diaphragms to be fully open and the measuring circuit sensitivity properly designed, that scene brightness which produces a pointer deflection to mark $b$ is the minimum at which the fastest film can be properly exposed at the slowest shutter speed. A selection of the slowest film and shortest shutter speed decreases the photographic value of these factors to $\frac{1}{64}$ that of the fastest film speed-longest exposure combination, and the Fig. 5 tabulations indicate that a proper exposure requires a scene brightness at least equal to that corresponding to an instrument reading $h$ when the maximum photocell area is used. The iris diaphragms are employed to throttle the light energy to obtain the appropriate readings when the scene brightness is above the minimum value required for a proper exposure of the film.

The Fig. 5 tabulation indicates that only the scale range $b-h$ is significant (for the assumed film speed and shutter timing ranges) and that the angular adjustment of the instrument housing 7, Fig. 1, can be restricted to that range. A linear development 42' of the full scale is shown in Fig. 7 above, and spaced from, the upper edge of the disk 15. The guide lines 13 extend from the disk 15 and their upper ends aline with the scale graduations $b$ to $h$. If the mark 17 of disk 15 alines with the extreme right line, the scale mark $h$ indicates the appropriate pointer position for the exposure factor values set on the disks 15, 20, 24. The indicator mark 10 is stationary, Figs. 1 and 2, and the instrument casing 7 should therefore be adjusted to place the zero pointer position in line with the "0" mark of the scale 42'. The full scale 42' need not be placed on the casing 7 and only the mark 12 is used when the several disks are arranged below the guide lines 13 to indicate the appropriate setting for mark 12.

As shown in Fig. 7, a series of graduations 35 of marks and corresponding symbols b to h may be provided on the instrument casing 7 when a single mark 36 is arranged on the camera case 1 adjacent the opening 11. A plate bearing the Fig. 5 tabulation is affixed to the camera case but is not shown in Fig. 7.

The measuring range of the instrument may be restricted to range of light values corresponding to the various combinations of film speed and shutter timing. This permits an expansion of the instrument scale, as shown in Fig. 8, to spread the graduations 0—h over the range of pointer displacement.

The instrument casing 7 may be arranged, as shown in Figs. 9 and 10, for adjustment about a horizontal axis which coincides with the axis of setting disks 15, 20, 24 that are mounted on the front wall of the camera case. These disks carry the scale graduations which are illustrated in Fig. 2, and the guide lines 13' may be formed on the case 1 or on a separate plate. A post 37 is secured to the instrument casing 7, extends through the arcuate slot 38 in the case 1 and carries a knob 39 which has a pointer or mark for alinement with the particular guide line 13' that is indicated by the mark 17 of disk 15. The photocell and camera lens elements may be substantially as shown in Figs. 1–3, and the method of operation is substantially as described with reference to that form of the invention.

As shown in Figs. 11 and 12, the instrument casing 7 is fixed to the camera case 1, as by the bracket 40, and the index mark 10' is adjusted in accordance with the selected values of film speed and shutter timing. Scale disks 15, 20, 24, as previously described, are mounted on the top wall and coaxial with the instrument coil 5. The indicator mark 10' is carried by a plate 41 that is pivoted on the common axis of the disks and coil, and has a mark 42 which is visible through the arcuate slot 43 in the case 1. A handle or stud 44 is secured to the plate 41 and extends through the slot 43 to facilitate the turning of the plate to aline its mark 42 with the indicated guide line 13'. The photocell and mechanism for regulating its current output, not shown in Figs. 11 and 12, may be substantially as shown in Figs. 1–3.

The embodiment illustrated in Figs. 13 and 14 includes a small instrument in a case 7 at the rear of the front wall and connected to the knob 45, the axis of the knob coinciding with the axis of the instrument coil 5. The knob has a flat collar 46 bearing a mark 47 for setting the knob, and thereby the instrument, in different angular positions as determined by the guide lines 13" on the plate 14'. The disk 48 has a stud 49 by which it may be turned about the fixed disk 50 to control the frame speed by means, not shown, within the camera case 1. A setting mark 51 and "frames" scale 52 are shown on disks 50, 48, respectively, but these locations may be reversed. The upper edge of disk 48 travels along the lower edge of plate 14', and has graduations 53 of film speed values that fall in line with different guide lines in accordance with the setting of the frame speed. As illustrated in Fig. 14, the frame speed is set for 16 frames per second and the mark 47 of the instrument adjusting knob is alined with the 15° DIN value.

The photocell 26, camera lens 35 and their associated elements may be substantially as previously described in connection with Figs. 1 to 3, but these parts are preferably mounted flush with the front wall, as shown in Fig. 14. A single control member 57 is provided for adjusting the iris diaphragms and the spring motor, not shown, of the camera mechanism. This control member may be a lever or crank arm on the end of a hollow shaft 58 that is pressed inward to displace the camera control arm 59 to start the film feed and shutter mechanism. A pivoted latch 60 extends under the flanged head 61 of the control member to prevent the accidental starting of the camera, the latch being movable counter-clockwise into the dotted line position to release the control member when a scene is to be photographed. Hollow shaft 58 is slidable on and pinned to the shaft 58' of a bevel gear 62 that meshes with a bevel gear 63, the gear 63 being fixed to a spur gear 63' that meshes with the gear segment 32 of the adjusting member 33' of the camera lens diaphragm 34. Gear segment 32 also meshes with gear 37 of the member 29' that controls the setting of the iris diaphragm 28 of the cell 26.

The electrical system is so designed that the instrument pointer 6 is located at the right edge of the view finder lens 3, as shown, at zero current flow. Increasing current flow displaces the pointer 6 in the direction of the arrow 64 and this motion, as viewed through the view finder, is a clockwise motion which conforms to conventional instrument operation. The iris diaphragms and control lever 57 are so related that movement of lever 57 in the direction of the arrow 65 reduces the diaphragm opening, thus causing the pointer to swing towards its zero current position. The pointer 6 thus appears to "follow" the motion of the lever 57, and this relationship facilitates the correct adjustment of lever 57 to obtain the proper diaphragm opening under changing light conditions as the operator pushes the lever 57 in the direction in which the pointer must be moved to maintain it in line with the mark 10.

The movements of the control member in two planes at right angles to each other may be such that the rocking motion controls the camera motor, and the movement into and out of the case 1 controls the iris diaphragms. Resistance chokes of known types may be used in place of the iris diaphragm to throttle the current flow in accordance with the manual adjustment of the lens diaphragm.

When the camera has an electric motor drive, the lever 57' for adjusting the iris diaphragms may carry the motor switch, as shown in Fig. 15. The switch button 67 is grounded on the lever arm 57' and is normally held in outer position by a spring 68. The contact 69 is insulated from the arm 57' and connected by a lead 70 to the battery and motor, not shown, the second motor terminal being grounded on the camera housing.

It is to be understood that the described embodiments are illustrative of the invention and that there is considerable latitude in the design and construction of photographic apparatus falling within the spirit of my invention as set forth in the following claims.

I claim:

1. In a camera having a view finder, a lens and adjustable exposure apparatus, a photoelectric system for setting the exposure apparatus in accordance with the existing scene brightness and values of preselected exposure factors; said photoelectric system comprising photosensitive means connected to a measuring instrument having a pivoted coil carrying a pointer, an indicator mark with which said pointer is to be alined, said pointer and mark being visible in the camera view finder, means including adjustable members carrying cooperating marks and graduations of exposure factors for setting said instrument and indicator mark in different angular relations in accordance with the selected values of the exposure factors, and means for adjusting the current flow to said instrument to set the instrument pointer in line with said mark, said current adjusting means having means for mechanically coupling the same to said adjustable exposure apparatus of the camera.

2. The invention as claimed in claim 1, wherein said graduations of exposure factors of said setting means are uniformly spaced scale divisions marked respectively with values in a geometric progression of film speed and one of the factors of shutter timing and diaphragm opening, and said setting means includes a fiducial mark movable in accordance with the relative angular adjustment of said instrument and said indicator mark, and guide lines extending from one of said adjustable members towards said fiducial mark, said guide lines being uniformly spaced at the ends adjacent the adjustable member and being variably spaced at their opposite ends in accordance with angular displacement of the instrument pointer for current values in a geometric series.

3. In a motion picture camera having a view finder, and devices for adjusting the number of picture frames per second and the lens diaphragm, a photoelectric apparatus for the semiautomatic setting of the lens diaphragm in accordance with the existing scene brightness and the preselected exposure factors of frames per second and film speed; said apparatus comprising photosensitive means connected to an instrument having a pivoted coil carrying a pointer, an indicator member carrying a mark adjacent the path of movement of the pointer, said pointer and mark being visible in the camera view finder, means for varying the relative angular position of said instrument and indicator member, a pair of relatively movable members carrying cooperating setting marks and graduations of film speed and picture frames per second to indicate the angular adjustment of said instrument and indicator corresponding to an adjustment of said pair of members for the selected film speed and picture frame speed, and means adjustable to vary the current flow to said instrument to aline said pointer with the mark of said indicator member, said current-varying means having means for mechanically coupling the same to the camera lens diaphragm.

4. A motion picture camera as claimed in claim 3, wherein said current-varying means includes a member adjustable mechanically in a plane substantially parallel to the path of the pointer adjacent said mark to vary the current flow in that sense which results in deflections of the instrument pointer in the direction of movement of said adjustable member.

5. In a motion picture camera having a view finder, and devices for adjusting the number of picture frames per second and the lens diaphragm, a photoelectric apparatus for the semiautomatic setting of the lens diaphragm in accordance with the existing scene brightness and the preselected exposure factors of frames per second and film speed; said apparatus comprising photosensitive means connected to an instrument having a pivoted coil carrying a pointer, an indicator member carrying a mark adjacent the path of movement of the pointer, said pointer and mark being visible in the camera view finder, means for varying the relative angular position of said instrument and indicator member, a pair of relatively movable members carrying setting marks and cooperating graduations of film speed and picture frames per second, means carried by one member of said pair for actuating the device for controlling the picture frame speed of the camera, the setting marks and cooperating graduations indicating the appropriate angular adjustment for said instrument and indicator corresponding to an adjustment of said pair of members for the selected film speed and picture frame speed, and means adjustable to vary the current flow to said instrument to aline said pointer with the mark of said indicator member, said current-varying means having means for mechanically coupling the same to the camera lens diaphragm.

6. In photoelectric apparatus for use with a camera, a photocell, an instrument connected to said photocell and having a pivoted coil carrying a pointer, a member carrying an indicator mark, means for altering the relative angular location of said instrument and member about the axis of said coil to determine the current flow required to aline said pointer with said mark, relatively adjustable coaxial disks for determining the appropriate angular relation of said instrument and member in accordance with preselected values of two exposure factors, said disks carrying cooperating setting marks and scales graduated in film speed and one of the factors of shutter timing and diaphragm opening, and means adjustable to vary the current flow from said photocell to said instrument to aline the pointer with the indicator mark, thereby to determine the appropriate value at the existing scene brightness for the other of said factors of shutter timing and diaphragm opening.

7. Photoelectric apparatus as claimed in claim 6, wherein one of said disks has a stud for actuating the camera mechanism controlling the exposure factor for which graduations appear on said disks.

8. In exposure-determining apparatus, a photoelectric apparatus comprising a photocell, an instrument having a pivoted coil carrying a pointer, a member carrying an indicator mark, means for adjusting said instrument substantially about the axis of said coil to vary the current flow required to aline said pointer with said mark, a computer comprising adjustable members carrying scales graduated in film speed and in one of the exposure factors controlled by the exposure-determining mechanism of a camera, cooperating indicia carried by said instrument and one of the computer members to indicate the angular adjustment of said instrument corresponding to selected values of the exposure factors of said computer members, and means graduated in values of the other factor controlled by the camera exposure-determining mechanism for varying the current flow to said coil to bring the instrument pointer and mark into alinement.

9. In exposure-determining apparatus, a photoelectric apparatus comprising a photocell, an instrument having a pivoted coil carrying a pointer, an indicator member carrying an indicator mark, means for adjusting said member substantially about the axis of said coil to vary the current flow required to aline said pointer with said mark, a computer comprising adjustable members carrying scales graduated in film speed and in one of the exposure factors controlled by the exposure-determining mechanism of a camera, cooperating indicia carried by said indicator member and one of the computer members to indicate the angular adjustment of said indicator member corresponding to selected values of the exposure factors of said computer members, and means graduated in values of the other factor controlled by the camera exposure-determining mechanism for varying the current flow to said coil to bring the instrument pointer and mark into alinement.

10. A camera of the type including a case, a view finder, a lens, exposure controlling apparatus for said lens, a photocell, an instrument having a pointer, an indicator mark, the pointer and mark being visible in the view finder, means for adjusting the relative positions of said instrument and mark, means adjustable by said exposure controlling apparatus to vary current flow to said photocell in accordance with the selected value of one of the exposure factors of shutter speed and diaphragm opening, and adjustable members carrying scales of film speed and the other of said exposure factors for determining the setting of said adjusting means, characterized by the fact that said instrument and said adjustable members are supported on the front wall of said camera case.

11. In a camera, the combination with a camera case supporting a view finder, a camera lens and means for controlling the light passing through said lens; of a photoelectric system including a current generating cell, an instrument having a pointer visible in said view finder, an indicator mark also visible in said view finder, means adjustable in accordance with preselected exposure factors for determining the current magnitude which will aline the instrument pointer with said mark, and an adjustable member supported on a side wall of said camera case for varying the current flow established by said cell, said adjustable member having means for coupling the same to the light-controlling means of said camera lens.

12. In a camera, a camera case supporting a lens and light-controlling apparatus therefor, a photoelectric system including a cell mounted on the front wall of the camera, an instrument connected to said cell and having a pointer visible in the view finder, a fiducial mark cooperating with said pointer and visible in said view finder, an iris diaphragm in front of said cell, and means for adjusting said iris diaphragm, said means including a member movable in a plane substantially parallel to the path of said instrument pointer at its closest approach to said fiducial mark to vary the cell output current in that sense which results in a pointer deflection in the direction of movement of said member.

13. The invention as claimed in claim 12, wherein said movable member has means for coupling the same to the light-controlling apparatus of said camera lens.

14. In a camera having a front wall carrying a camera lens and a view finder lens, a photocell, an instrument mounted on the front wall beneath the view finder lens and having a pivoted coil carrying a pointer that extends into the field of said view finder lens, an indicator mark visible in the view finder lens, a knob at the front wall for adjusting the instrument about the axis of the pivoted coil, a mark carried by said knob, a plate on the front wall and having a series of guide lines terminating along the path of movement of the mark on said knob, a pair of concentric disks below said plate, the outer disk having a scale of an exposure factor adjacent the lower ends of said guide lines, and cooperating markings on said disks for setting the outer disk in accordance with a selected value of an exposure factor.

15. The invention as claimed in claim 14, wherein said cooperating markings include a scale of shutter timings, and the scale of said outer disk is graduated in values of film speed.

16. The invention as claimed in claim 14, wherein said cooperating markings include a scale of picture frames per second, and one of said disks is adapted to adjusted the frame speed of the camera.

17. In a motion picture camera having a motor, a camera case supporting a lens and exposure-controlling apparatus therefor, a photoelectric system including a cell carried by the case in a position to receive light from the area to be photographed, a view finder carried by said case, an instrument connected to said cell and having a pointer visible in the view finder, a fiducial mark cooperating with said instrument pointer and visible in the view finder, an iris diaphragm in front of said cell, means for adjusting said iris diaphragm, and means for controlling the motor of the camera; said diaphragm adjusting means and said motor controlling means having in common a manually adjustable member supported for angular movement to adjust the diaphragm and for axial movement to control the motor.

18. In a motion picture camera having a motor, a camera case supporting a lens and exposure-controlling apparatus therefor, a photoelectric system including a cell carried by the case in a position to receive light reflected from the area to be photographed, an instrument connected to said cell and having a pointer movable with respect to a mark, means for adjusting current flow to said cell in accordance with changes in a factor affecting the exposure, and means for controlling the motor of the camera; said means for adjusting current flow and said motor controlling means having in common a manually adjustable member supported for movement along one path to adjust said means and for movement along another path to control the motor.

HANS FERDINAND TÖNNIES.